United States Patent
Turtinen et al.

(10) Patent No.: US 12,396,037 B2
(45) Date of Patent: Aug. 19, 2025

(54) CONDITIONAL SKIPPING MONITORING OF DOWNLINK CONTROL CHANNEL

(71) Applicant: Nokia Technologies Oy, Espoo (FI)

(72) Inventors: Samuli Heikki Turtinen, Oulu (FI); Chunli Wu, Beijing (CN); Jussi-Pekka Koskinen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/955,646

(22) Filed: Nov. 21, 2024

(65) Prior Publication Data
US 2025/0081250 A1    Mar. 6, 2025

Related U.S. Application Data

(63) Continuation of application No. PCT/CN2022/121074, filed on Sep. 23, 2022.

(51) Int. Cl.
*H04W 74/0833* (2024.01)
*H04L 1/1812* (2023.01)
(Continued)

(52) U.S. Cl.
CPC ....... *H04W 74/0833* (2013.01); *H04L 1/1812* (2013.01); *H04W 72/0446* (2013.01); *H04W 72/115* (2023.01); *H04W 76/38* (2018.02)

(58) Field of Classification Search
CPC ......... H04W 72/0446; H04W 74/0833; H04W 72/115; H04W 76/38; H04L 1/1812
See application file for complete search history.

(56) References Cited

U.S. PATENT DOCUMENTS

2020/0077446 A1*  3/2020  Agiwal ............. H04W 74/0833
2021/0227604 A1*  7/2021  Huang ................ H04W 40/248
(Continued)

FOREIGN PATENT DOCUMENTS

| EP | 3751891 A1 | 12/2020 |
| WO | 2020/220378 A1 | 11/2020 |
| WO | 2021/253414 A1 | 12/2021 |

OTHER PUBLICATIONS

"3rd Generation Partnership Project; Technical Specification Group Radio Access Network; NR; NR and NG-RAN Overall Description, Stage 2 (Release 17)", 3GPP TS 38.300, V17.1.0, Jun. 2022, pp. 1-209.
(Continued)

*Primary Examiner* — Raj Jain
(74) *Attorney, Agent, or Firm* — Brake Hughes Bellermann LLP

(57) ABSTRACT

Embodiments of the present disclosure relate to for conditionally skipping monitoring of downlink control channel in random access. A first apparatus receives, from a second apparatus, a command indicating the first apparatus to skip monitoring a downlink control channel between the second apparatus and the first apparatus for a time period. The first apparatus initiates an RA procedure towards the second apparatus. The time period at least partially overlaps with a time window associated with the RA procedure and an end of the time period is after an end of the time window. The first apparatus determines whether the RA procedure is successfully completed or contention resolution for the RA procedure is successful. Based on the determination, the first apparatus ignores or performs the command after the end of the time window.

12 Claims, 7 Drawing Sheets

(51) Int. Cl.
*H04W 72/0446* (2023.01)
*H04W 72/115* (2023.01)
*H04W 76/38* (2018.01)

(56) References Cited

U.S. PATENT DOCUMENTS

| | | | |
|---|---|---|---|
| 2021/0259027 A1* | 8/2021 | Deogun | H04W 74/002 |
| 2021/0410063 A1* | 12/2021 | Bao | G01S 5/0018 |
| 2022/0295563 A1* | 9/2022 | Turtinen | H04W 74/006 |
| 2022/0304046 A1 | 9/2022 | Lin et al. | |
| 2022/0361024 A1* | 11/2022 | Xue | H04W 24/08 |
| 2023/0224875 A1* | 7/2023 | He | H04L 1/0027 |
| 2023/0239857 A1* | 7/2023 | Lee | H04W 72/12 370/329 |
| 2024/0414573 A1* | 12/2024 | Guo | H04W 52/0216 |

OTHER PUBLICATIONS

"LS on PDCCH skipping", 3GPP TSG-RAN WG1 Meeting #110, R1-2208210, RAN1, Aug. 22-26, 2022, 2 pages.

"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Radio Access Network; NR; Physical layer procedures for control (Release 17)", 3GPP TS 38.213, V17.2.0, Jun. 2022, pp. 1-256.

"IEEE 802.11", Wikipedia, Retrieved on Sep. 23, 2024, Webpage available at : https://en.wikipedia.org/wiki/IEEE_802.11.

International Search Report and Written Opinion received for corresponding Patent Cooperation Treaty Application No. PCT/CN2022/121074, dated Feb. 20, 2023, 10 pages.

* cited by examiner

CONDITIONAL SKIPPING MONITORING OF DOWNLINK CONTROL CHANNEL

RELATED APPLICATION

The present application is a 37 C.F.R. § 1.53 (b) continuation of co-pending Patent Cooperation Treaty Application No. PCT/CN2022/121074, filed on Sep. 23, 2022, which is hereby incorporated in its entirety.

FIELD

Embodiments of the present disclosure generally relate to the field of telecommunication and in particular, to an apparatus, method, and computer readable storage medium for conditionally skipping monitoring of downlink (DL) control channel.

BACKGROUND

Skipping monitoring of downlink control channel is a method for reducing battery consumption by indicating a terminal device to skip monitoring of a DL control channel for a certain time period. If skipping monitoring of a DL control channel is supported, the terminal device may receive, during or prior to a random access (RA) procedure, a command indicating the terminal device to skip monitoring a DL control channel. Thus, it is needed to clarify how the terminal device should operate in respect to skipping monitoring of a DL control channel during an ongoing RA procedure and after a successful contention resolution or the RA procedure is successfully completed.

SUMMARY

In general, example embodiments of the present disclosure provide a solution for conditionally skipping monitoring of a DL control channel during an RA procedure and after a successful contention resolution or the RA procedure is successfully completed.

In a first aspect, there is provided a first apparatus. The first apparatus comprises at least one processor; and at least one memory storing instructions that, when executed by the at least one processor, cause the first apparatus at least to receive, from a second apparatus, a command indicating the first apparatus to skip monitoring a downlink control channel between the second apparatus and the first apparatus for a time period; initiate an RA procedure towards the second apparatus, the time period at least partially overlapping with a time window associated with the RA procedure, and an end of the time period being after an end of the time window; determine whether the RA procedure is successfully completed or contention resolution for the RA procedure is successful; and based on the determination, ignore or perform the command after the end of the time window.

In a second aspect, there is provided a method implemented at a first apparatus. The method comprises: receiving, from a second apparatus, a command indicating the first apparatus to skip monitoring a downlink control channel between the second apparatus and the first apparatus for a time period; initiating an RA procedure towards the second apparatus, the time period at least partially overlapping with a time window associated with the RA procedure, and an end of the time period being after an end of the time window; determining whether the RA procedure is successfully completed or contention resolution for the RA procedure is successful; and ignoring or performing the command after the end of the time window based on the determination.

In a third aspect, there is provided a first apparatus. The first apparatus comprises: means for receiving, from a second apparatus, a command indicating the first apparatus to skip monitoring a downlink control channel between the second apparatus and the first apparatus for a time period; means for initiating a random access (RA) procedure towards the second apparatus, the time period at least partially overlapping with a time window associated with the RA procedure, and an end of the time period being after an end of the time window; means for determining whether the RA procedure is successfully completed or contention resolution for the RA procedure is successful; and means for ignoring or performing the command after the end of the time window based on the determination.

In a fourth aspect, there is provided a non-transitory computer readable medium comprising a computer program for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
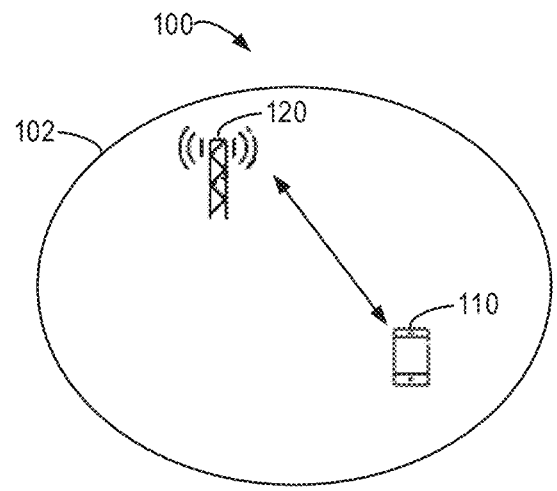
FIG. 1 illustrates an example communication network in which embodiments of the present disclosure may be implemented.

Principles of the present disclosure will now be described with reference to some example implementations. It is to be understood that these implementations are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as, but not limited to, fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT), Wi-Fi and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned systems.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the JAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

FIG. 1 shows an example communication network 100 in which embodiments of the present disclosure can be implemented. The network 100 includes a first apparatus 110 and a second apparatus 120 that can communicate with each other. In this example, the first apparatus 110 is illustrated as a terminal device, and the second apparatus 120 is illustrated as a network device serving the terminal device. Thus, the serving area of the second apparatus 120 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be located in the cell 102 and served by the second apparatus 120.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the first apparatus 110 and the second apparatus 120 can communicate data and control information to each other. In the case where the first apparatus 110 is the terminal device and the second apparatus 120 is the network device, a link from the second apparatus 120 to the first apparatus 110 is referred to as a downlink (DL), while a link from the first apparatus 110 to the second apparatus 120 is referred to as an uplink (UL).

To support power saving, the second apparatus 120 may transmit a command indicating the first apparatus 110 to skip monitoring a DL control channel for a time period. Skipping monitoring of a DL control channel may be beneficial in the cases of scheduling gaps due to beam sweeping or other scheduling decision at the side of a transmitter. For example, the second apparatus 120 may have a number of terminal devices to schedule e.g. in distinct beams but the scheduling cannot be completed simultaneously. Similarly, skipping monitoring of a DL control channel may be also in the cases when no data is available for a terminal device. The second apparatus 120 may indicate to one or more of the terminal devices that they are allowed to skip monitoring the DL control channel for a while, i.e. these terminal devices will not be scheduled until a number of time slots, and thus, they may enter a sleep mode for battery saving.

Figure 2:
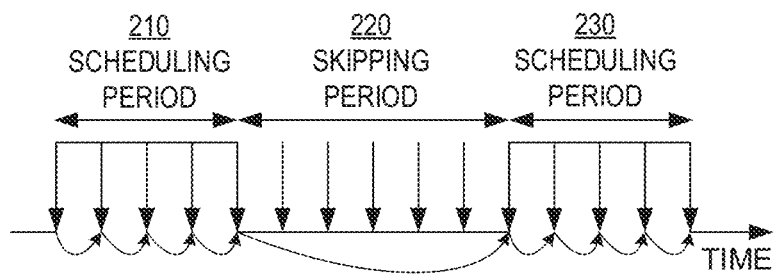
FIG. 2 illustrates a skipping monitoring of a DL control channel according to some example embodiments of the present disclosure.

FIG. 2 illustrates a skipping monitoring of a DL control channel according to some example embodiments of the present disclosure. As shown, in a scheduling period 210, the second apparatus 120 schedules the first apparatus 110 continuously. If the second apparatus 120 will not schedule the first apparatus 110 for a while, at the end of the scheduling period 210, the second apparatus 120 may transmit to the first apparatus 110 a skipping command indicating the first apparatus 110 to skip monitoring a DL control channel for a time period 220. During the time period 220, the first apparatus 110 will perform the command and will not monitor the DL control channel during the time period. In this regard, terms "skip monitoring", "performing a skipping command" and "not monitoring the DL control channel" may be used interchangeably.

For the purpose of discussion, the time period in which the first apparatus 110 skips monitoring a DL control channel is also referred to as a skipping period. The skipping period 220 may be indicated explicitly in the skipping command from the second apparatus 120 or could be configured upfront by the second apparatus 120, e.g. via a radio resource control (RRC) signaling. For example, the skipping period 220 may include the number of monitoring occasions or time duration.

Upon an end of the skipping period 220, the first apparatus 110 resumes to monitor the DL control channel in a scheduling period 230.

If skipping monitoring of a DL control channel is supported, the second apparatus 120 may transmit the skipping command to the first apparatus 110 during and/or prior to a random access (RA) procedure.

If skipping monitoring of a DL control channel is supported, the first apparatus 110 may indicate to the second apparatus 120 its support of skipping of a DL control channel, for example, by means of a UE capability message.

The second apparatus 120 considers the capability of the first apparatus 110 when configuring the skipping command to the first apparatus 110 and when scheduling or assigning radio resources to the first apparatus 110 (accounting for the skipping period, for example).

However, the first apparatus 110 may ignore the skipping command if the first apparatus 110 is on one of the following:
- all serving cells of the corresponding Cell Group when scheduling request (SR) is sent and is pending;
- Special Cell (SpCell) while a contention resolution (CR) timer is running;
- SpCell during monitoring of the RA response (RAR) or message B (MsgB) window.

Conventionally, if the skipping period expands beyond the contention resolution timer, a terminal device would continue the skipping after the CR timer is stopped or after expiration of the CR timer. This may be counter-productive in cases where the RA procedure is performed, for example, for the reason of UL data arrival since the terminal device would expect to receive further UL grants to transmit the UL data.

According to some example embodiments, there is provided a solution for conditional skipping monitoring of a DL control channel during an RA procedure and after a successful contention resolution or the RA procedure is successfully completed. According to the solution, an apparatus ignores or performs a skipping command based on a result of a contention resolution or RA procedure completion. In this way, power saving of the apparatus may be optimized.

Figure 3:
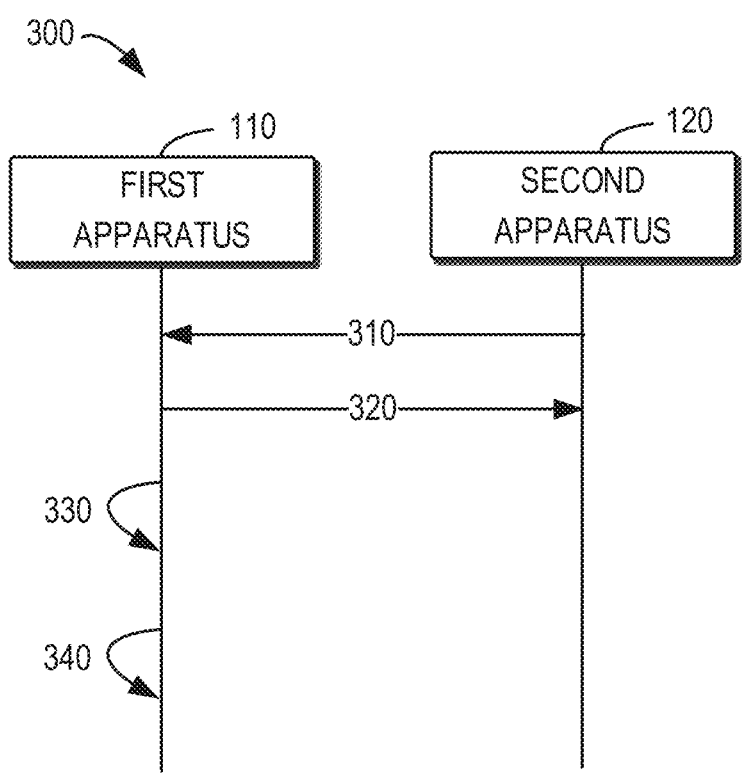
FIG. 3 illustrates a signaling chart illustrating a process for conditionally skipping monitoring of a DL control channel according to some example embodiments of the present disclosure.

Reference is now made to FIG. 3, which shows a signaling chart illustrating a process 300 for conditional skipping monitoring of a DL control channel during an RA procedure according to some example embodiments of the present disclosure. For the purpose of discussion, the process 300 will be described with reference to FIG. 1. The process 300 may involve the first apparatus 110 and the second apparatus 120 as illustrated in FIG. 1. Although the process 300 has been described in the communication network 100 of FIG. 1, this process may be likewise applied to other communication scenarios.

The first apparatus 110 receives in 310 a skipping command from the second apparatus 120. The skipping command indicates the first apparatus 110 to skip monitoring a DL control channel between the second apparatus 120 and the first apparatus 110 for a time period (which is also referred to as a skipping period).

In some example embodiments when the first apparatus 110 is a terminal device and the second apparatus 120 is a network device, the DL control channel to be monitored may be a physical downlink control channel (PDCCH). The PDCCH is called a scheduling channel in a sense that it carries scheduling information. Control information transmitted through the PDCCH is referred to as downlink control information (DCI). By monitoring the DL control channel, the first apparatus 110 may determine when and/or how it is scheduled to transmit data to the second apparatus 120. The skipping command may be transmitted to the first apparatus 110 in control information, such as in PDCCH.

The first apparatus 110 initiates 320 an RA procedure towards the second apparatus 120. For example, the first apparatus 110 may initiate the RA procedure by transmitting an RA preamble to the second apparatus 120.

The skipping period at least partially overlaps with a time window associated with the RA procedure. An end of the skipping period is after an end of the time window. For the purpose of discussion, the time window associated with the RA procedure is also referred to as an RA time window.

In some embodiments, the RA time window may be defined by at least one of the following: a contention resolution timer, a message B (MsgB) response window, or an RA response window.

In some embodiments, the action 310 may be performed before the action 320. In such embodiments, the first apparatus 110 receives the skipping command prior to the RA procedure. For example, the skipping command may be received when the first apparatus 110 is going to enter the RA procedure.

In some other embodiments, the action 310 may be performed after the action 320. In such embodiments, the first apparatus 110 receives the skipping command during the RA procedure. In other words, the skipping command may be received when the first apparatus 110 is in an ongoing RA procedure.

In still other embodiments, the actions 310 and 320 may be performed in parallel.

With continued reference to FIG. 3, the first apparatus 110 determines 330 whether the RA procedure is successfully completed or contention resolution for the RA procedure is successful.

In turn, based on the determination, the first apparatus 110 ignores or performs 340 the command after the end of the time window.

With the process 300, the first apparatus 110 ignores or performs the skipping command based on a result of the contention resolution or RA procedure completion. In this way, power saving of the first apparatus 110 may be optimized.

In some embodiments, the first apparatus 110 may determine the end of the RA time window based on one of the following: the RA time window being stopped, or expiration of the RA time window. As an example, the RA time window may be stopped upon successful RA operation (e.g. successful contention resolution or reception of RA response). As another example, the RA time window may expire upon unsuccessful RA operation (e.g. an unsuccessful contention resolution or unsuccessful reception or RA response).

To better understand actions performed by the first apparatus 110 based on the result of the contention resolution or RA procedure completion, relationships between a skipping period and an RA time window will be described with reference to FIGS. 4A and 4B.

Figure 4A:
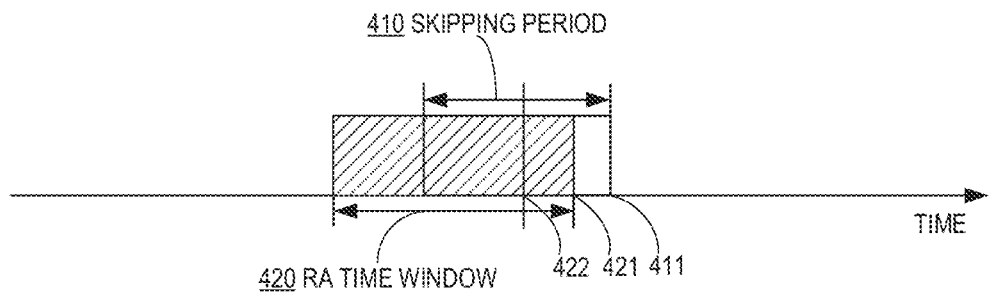
FIGS. 4A and 4B illustrate relationships between a skipping period and a time window associated with RA according to some example embodiments of the present disclosure.

As shown in FIG. 4A, a skipping period 410 partially overlaps with the RA time window 420. A start of the skipping period 410 is after a start of the RA time window 420.

The RA time window 420 expires at time 421. In some embodiments, the first apparatus 110 may determine an end of the RA time window 420 based on the RA time window 420 expiring at time 421.

Alternatively, in other embodiments, the first apparatus 110 may stop the RA time window 420 before the RA time window 420 expires at time 421. For example, the first apparatus 110 may stop the RA time window 420 at time 422 before time 421. In such embodiments, the first apparatus 110 may determine an end of the RA time window 420 based on the RA time window 420 being stopped at time 422.

The skipping period 410 expires at time 411. In other words, the skipping period 410 ends at time 411 after the RA time window 420 is stopped at time 422 or after the RA time window 420 expires at time 421.

Figure 4B:
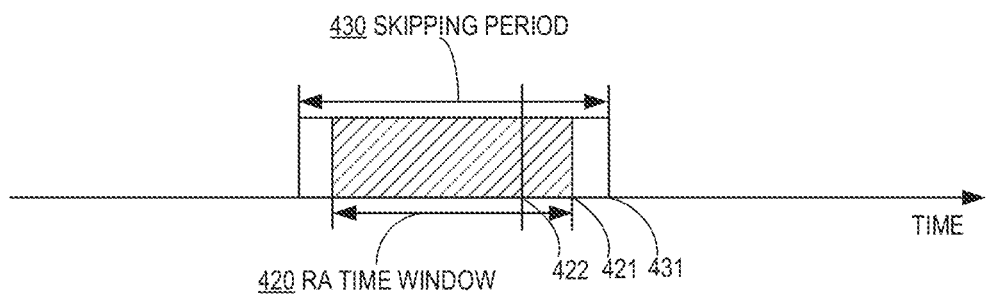

As shown in FIG. 4B, a skipping period 430 partially overlaps with the RA time window 420. The example of FIG. 4B is different from that of FIG. 4A in that a start of the skipping period 430 is prior to a start of the RA time window 420.

Similar to the example of FIG. 4A, the first apparatus 110 may determine an end of the RA time window 420 based on the RA time window 420 expiring at time 421. Alternatively, the first apparatus 110 may determine an end of the RA time window 420 based on the RA time window 420 being stopped at time 422.

Similar to the example of FIG. 4A, the skipping period 430 ends at time 431 after the RA time window 420 is stopped at time 422 or after the RA time window 420 expires at time 421.

In some embodiments, if the contention resolution is successful or the RA procedure is successfully completed, the first apparatus 110 may expect to receive scheduling commands from the second apparatus 120 to avoid delay of UL transmissions. Thus, the first apparatus 110 may ignore the skipping command after stopping the RA time window. This will be described with reference to FIG. 5.

Figure 5:
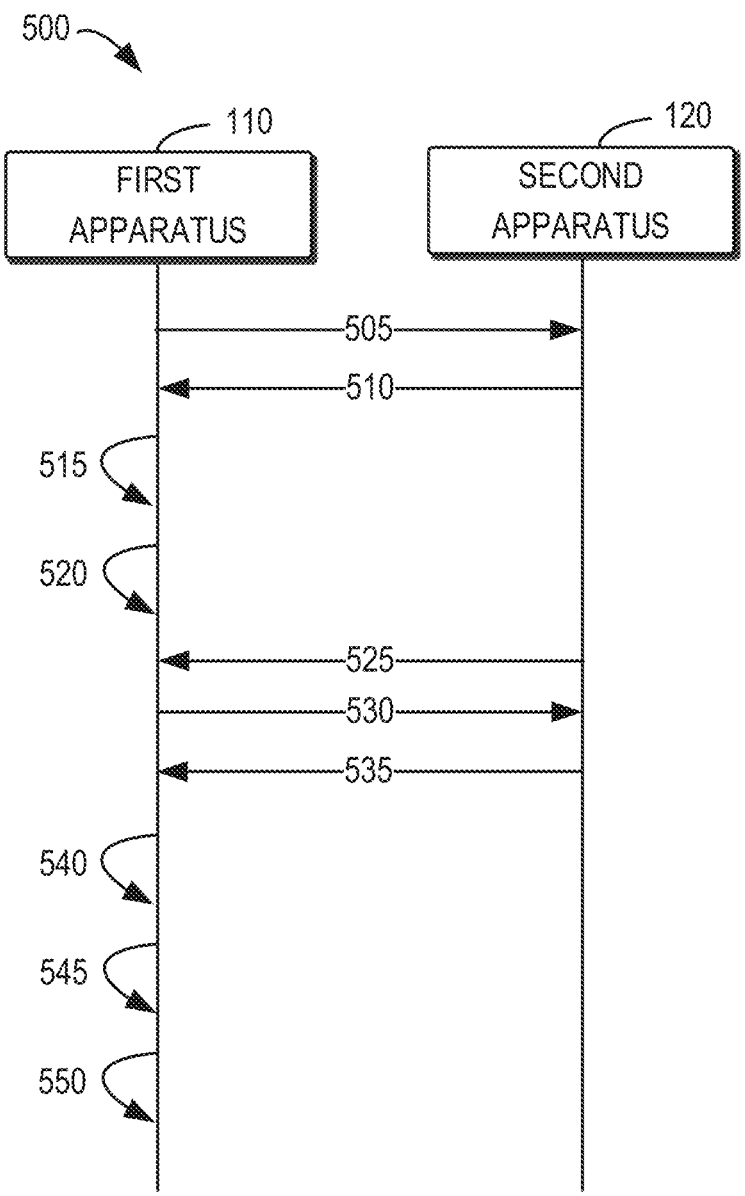
FIG. 5 illustrates a signaling chart illustrating a process for conditionally skipping monitoring of a DL control channel according to some other example embodiments of the present disclosure.

FIG. 5 illustrates a signaling chart illustrating a process 500 for conditionally skipping monitoring of a DL control channel during an RA procedure according to some other example embodiments of the present disclosure. For the purpose of discussion, the process 500 will be described with reference to FIG. 1. The process 500 may involve the first apparatus 110 and the second apparatus 120 as illustrated in FIG. 1. The process 500 may be considered as an example implementation of the process 300.

As shown in FIG. 5, the first apparatus 110 transmits 505 an RA preamble to the second apparatus 120 so as to initiate an RA procedure. The RA procedure may be a contention-based RA procedure.

Upon reception of the RA preamble, the second apparatus 120 may estimate transmission timing of the first apparatus 110 to enable uplink synchronization of the first apparatus 110.

If the second apparatus 120 will not schedule the first apparatus 110 for a while, the second apparatus 120 may transmit 510 a skipping command to the first apparatus 110. The skipping command indicates the first apparatus 110 to skip monitoring the DL control channel for a skipping period. For example, the skipping command may indicate the first apparatus 110 to skip monitoring the DL control channel for the skipping period 410 as shown in FIG. 4A or for the skipping period 430 as shown in FIG. 4B. It should be noted that operation in 510 may happen before 505 or after 525 or before second apparatus has decoded the transmission from first apparatus in 530.

Upon reception of the skipping command, in order to obtain from the second apparatus 120 information necessary for the RA procedure, the first apparatus 110 determines 515 whether the skipping period overlaps with an RA time window. For example, in this example implementation, the first apparatus 110 may determine whether the skipping period overlaps with an RA response window.

If the first apparatus 110 determines that the skipping period entirely overlaps with the RA response window, the first apparatus 110 may ignore 520 the skipping command. Thus, the reception of the RA response is ensured. If the first apparatus 110 ignores the skipping command, the first apparatus 110 will monitor the DL control channel. In this regard, terms "ignoring a skipping command" and "monitoring the DL control channel" may be used interchangeably.

On the other hand, if the first apparatus 110 determines that the skipping period partially overlaps with the RA response window, the first apparatus 110 may perform 520 the skipping command until a start of the RA response window. From the start of the RA response window, the first apparatus 110 ignores the skipping command to monitor the DL control channel. In this way, the scheduling flexibility may be enabled and the reception of the RA response is ensured.

For example, as shown in FIG. 4B, the first apparatus 110 may perform the skipping command from a start of the skipping period 430 to a start of the RA response window 420. From the start of the RA response window 420, the first apparatus 110 ignores the skipping command to monitor the DL control channel.

Alternatively, if the first apparatus 110 determines that the skipping period does not overlap with the RA response window, the first apparatus 110 may perform the skipping command. As such, the scheduling flexibility may be enabled.

Based on the estimated transmission timing of the first apparatus 110, the second apparatus 120 may transmit 525 an RA response to the first apparatus 110. The RA response may include information about timing advance for the first apparatus 110, and UL resources to be used by the first apparatus 110 in an action of 530.

Upon reception of the RA response, the first apparatus 110 transmits 530 to the second apparatus 120 a scheduled transmission by using the UL resources indicated in the RA response. The scheduled transmission may include a Cell Radio Network Temporary Identifier (C-RNTI) of the first apparatus 110 or another ID of the first apparatus 110.

The first apparatus 110 determines 540 whether the RA procedure is successfully completed or contention resolution for the RA procedure is successful. If the contention resolution is successful or the RA procedure is successfully completed, the first apparatus 110 stops 545 the RA time window. In turn, the first apparatus 110 ignores 550 the skipping command after stopping the RA time window.

For example, the first apparatus 110 may stop the RA time window 420 at time 422 as shown in FIG. 4A. The first apparatus 110 may ignore the skipping command after stopping the RA time window 420 at time 422 until the end (at time 411) of the skipping period 410. For another example, the first apparatus 110 may stop the RA time window 420 at time 422 as shown in FIG. 4B. The first apparatus 110 may ignore the skipping command after stopping the RA time window 420 at time 422 until the end (at time 431) of the skipping period 410.

In this example implementation, the first apparatus 110 ignores the skipping command from the start of the RA response window 420 to the stop of the RA time window 420 at time 422, and the first apparatus 110 does not continue skipping monitoring of the DL control channel.

In this example implementation, if the second apparatus 120 determines that the first apparatus 110 is successful in a contention resolution for the RA procedure, the second apparatus 120 may perform 535 a transmission on the DL control channel to the first apparatus 110. The transmission is addressed to a Cell Radio Network Temporary Identifier (C-RNTI) of the first apparatus 110. For example, the transmission may comprise a contention resolution message. For example, the contention resolution message may comprise a PDCCH transmission addressed to the C-RNTI of the first apparatus.

In other example implementation, the transmission (at 535) on the DL control channel may further comprise an uplink grant for a new transmission.

If the second apparatus 120 determines that the first apparatus 110 is unsuccessful in the contention resolution for the RA procedure, the second apparatus 120 may perform a transmission on the DL control channel to other terminal device.

If the first apparatus 110 receives the transmission addressed to the C-RNTI of the first apparatus 110 on the DL control channel from the second apparatus 120, the first apparatus 110 may determine that the contention resolution is successful. In turn, the first apparatus 110 may determine that the RA procedure is successfully completed.

In some embodiments, if the first apparatus 110 receives the transmission addressed to the C-RNTI of the first apparatus 110 on the DL control channel from the second apparatus 120, the first apparatus 110 may stop the RA time window and determine that the contention resolution is successful. In other words, the actions of stopping the RA time window and determining that the contention resolution is successful may be performed in parallel.

On the other hand, if the first apparatus 110 does not receive the transmission on the DL control channel from the second apparatus 120 within the RA time window, the first apparatus 110 may determine that the contention resolution is unsuccessful. In this case, the second apparatus 120 is not yet aware of the first apparatus 110 performing the RA procedure. Hence, the second apparatus 120 does not expect any interruption of the skipping period. Thus, the first apparatus 110 may perform the skipping command after the end of the RA time window. For example, the first apparatus 110 may perform the skipping command after the RA time window 420 expires at time 421. In other words, the first apparatus 110 continues skipping monitoring of the DL control channel.

In some embodiments, if the contention resolution is unsuccessful, the first apparatus 110 may transmit a new RA preamble to the second apparatus 120 to initiate the RA procedure again. If the number of transmitting RA preambles exceeds a preconfigured threshold, the first apparatus 110 may determine that the RA procedure is unsuccessfully completed. In such embodiments, the first apparatus 110 may perform the skipping command after the end of the RA time window.

It shall be understood that from the start of RA time window 420 to the end of the RA time window 420, the first apparatus 110 ignores the skipping command to obtain from the second apparatus 120 information for the RA procedure.

It is to be understood that although the process 500 has been described in connection with the RA response window, a similar process can be applied to a time window defined by RA contention resolution timer or a MsgB response window.

It is also to be understood that although the process 500 has been described by taking a 4-step RA procedure for example, a similar process may be applied to a 2-step RA procedure.

It is further to be understood that although the process 500 has been described by taking the action 505 occurring prior to the action 510, in other example implementations, the action 505 may occur subsequent to the action 510.

In some embodiments, if the first apparatus 110 receives a transmission on the downlink control channel which is addressed to the C-RNTI of the first apparatus 110 and contains an uplink grant for a new transmission, the first apparatus 110 may determine that the contention resolution is successful or the RA procedure is successfully completed. In turn, the first apparatus 110 may perform the skipping command in some cases. This will be described with reference to FIG. 6.

Figure 6:
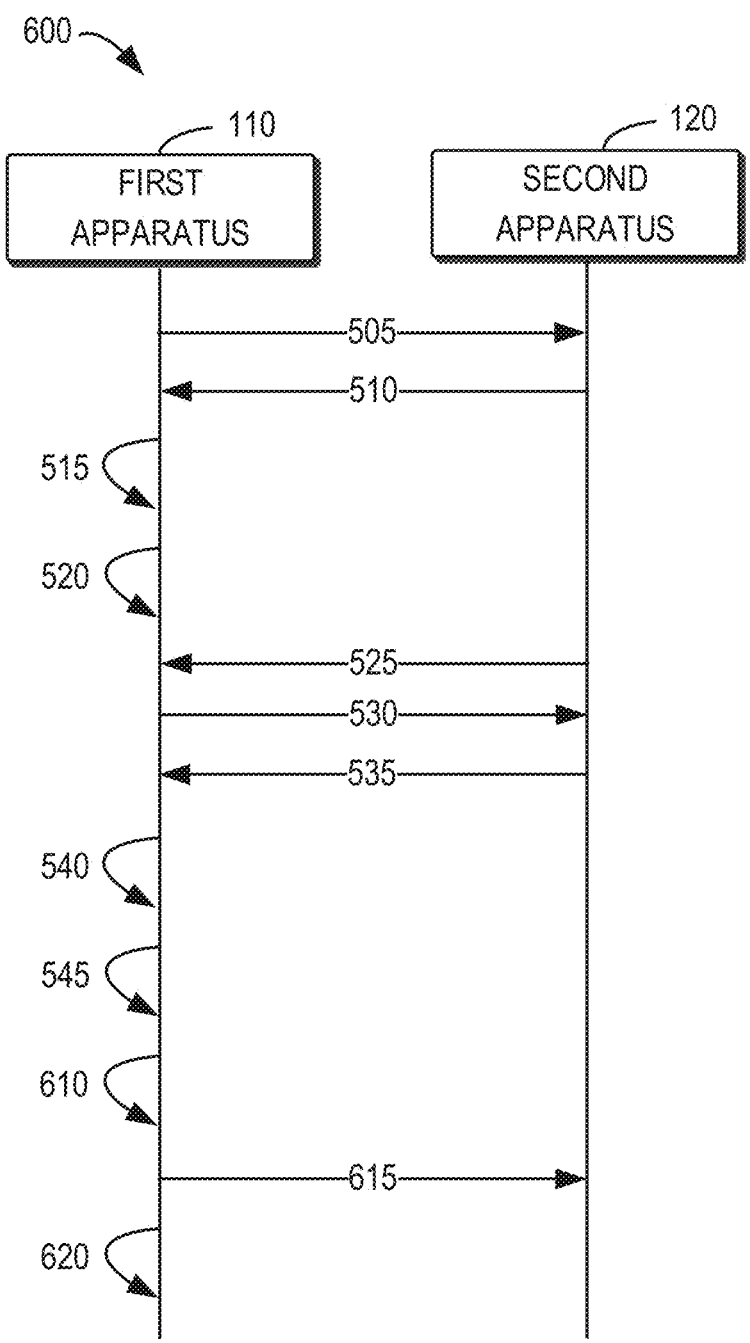
FIG. 6 illustrates a signaling chart illustrating a process for conditionally skipping monitoring of a DL control channel according to still other example embodiments of the present disclosure.

FIG. 6 illustrates a signaling chart illustrating a process 600 for conditionally skipping monitoring of a DL control channel during an RA procedure according to some other example embodiments of the present disclosure. For the purpose of discussion, the process 600 will be described with reference to FIG. 1. The process 600 may involve the first apparatus 110 and the second apparatus 120 as illustrated in FIG. 1. The process 600 may be considered as another example implementation of the process 300.

The actions 505, 510, 515, 520, 525, 530, 535, 540 and 545 in the process 600 are the same as those in the process 500. Details of these actions are omitted for brevity.

The process 600 is different from the process 500 in actions 610, 615 and 620.

Specifically, the first apparatus 110 determines 610 whether the uplink grant can accommodate all data to be transmitted by the first apparatus 110.

If the uplink grant can accommodate all the data, the first apparatus 110 transmits 615 all the data to the second apparatus 120 based on the uplink grant.

In this case, because the first apparatus 110 transmits all the data to the second apparatus 120 based on the uplink grant, the first apparatus 110 does not require further scheduling information in a timely manner. Thus, the first apparatus 110 may perform 620 the skipping command after transmitting the data. Alternatively, the first apparatus 110 may perform 620 the skipping command after stopping the time window 420.

On the other hand, if the uplink grant cannot accommodate all the data, the first apparatus 110 may ignore the skipping command after transmitting part of the data. Alternatively, the first apparatus 110 may ignore the skipping command after determining 610 the uplink grant can accommodate all the data and before transmitting part of the data.

It should be noted that similar determination of whether to continue skipping command may be applicable similarly to a scheduling request (SR) procedure. The first apparatus 110 may ignore a PDCCH skipping command after sending a scheduling request to the second apparatus 120 while the scheduling request is pending. In an example, the first apparatus 110 may ignore the PDCCH skipping command after the pending SR is cancelled after a buffer status report (BSR) is transmitted by the first apparatus 110 to the second apparatus 120. In one example, the PDCCH skipping command may be ignored by the first apparatus 110 when there is still data remaining in the buffer of the first apparatus 110 after the UL transmission.

In some embodiments, the first apparatus 110 may initiate the RA procedure in a Special Cell (SpCell) and ignore the skipping command in the SpCell only.

Alternatively, in some embodiments, the first apparatus 110 may initiate the RA procedure in the SpCell and ignore the skipping command in a subset of serving cells in a cell group comprising the SpCell.

In some embodiments, the first apparatus 110 may initiate the RA procedure in the SpCell and ignore the skipping command in all serving cells in a cell group comprising the SpCell.

In some embodiments, the SpCell may comprise a primary cell (PCell) in a master cell group (MCG).

Alternatively, in some embodiments, the SpCell may comprise a secondary primary cell (SPCell) in a secondary cell group (SCG).

Figure 7:
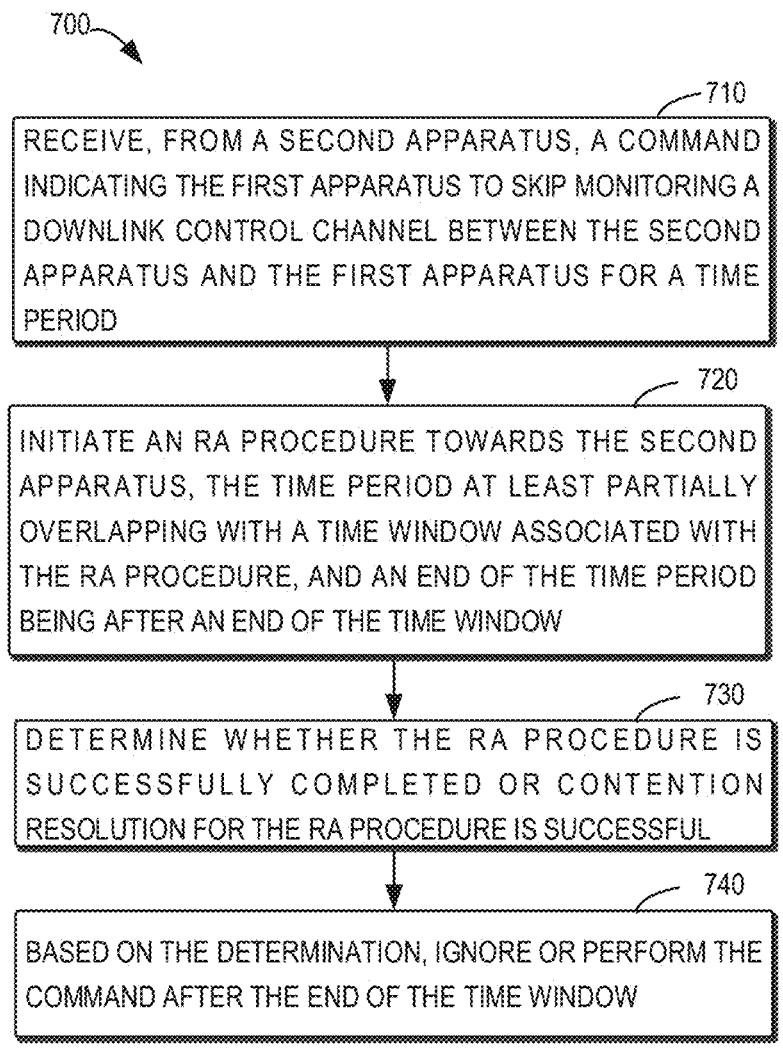
FIG. 7 illustrates a flowchart of a method implemented at a first apparatus according to some example embodiments of the present disclosure.

FIG. 7 shows a flowchart of an example method 700 implemented at a first apparatus in accordance with some example embodiments of the present disclosure. For the purpose of discussion, the method 700 will be described from the perspective of the first apparatus 110 with reference to FIG. 1.

At block 710, the first apparatus 110 receives, from the second apparatus 120, a skipping command indicating the first apparatus to skip monitoring a downlink control channel between the second apparatus 120 and the first apparatus 110 for a time period.

At block 720, the first apparatus 110 initiates an RA procedure towards the second apparatus 120. The time period at least partially overlaps with a time window associated with the RA procedure, and an end of the time period is after an end of the time window.

At block 730, the first apparatus 110 determines whether the RA procedure is successfully completed or contention resolution for the RA procedure is successful.

At block 740, based on the determination, the first apparatus 110 ignores or performs the skipping command after the end of the time window.

In some example embodiments, the method 700 further comprises: determining the end of the time window based on one of the following: the time window being stopped, or expiration of the time window.

In some embodiments, ignoring or performing the command after the end of the time window comprises: ignoring the command after stopping the time window in accordance with a determination that the contention resolution is successful or the RA procedure is successfully completed.

In some example embodiments, the method 700 further comprises: determining that the contention resolution is successful in accordance with a determination that a transmission on the downlink control channel is received within the time window, the transmission being addressed to a Cell Radio Network Temporary Identifier (C-RNTI) of the first apparatus.

In some embodiments, the transmission contains an uplink grant for a new transmission.

In some example embodiments, the method 700 further comprises: stopping the time window in accordance with a determination that the transmission on the downlink control channel is received.

In some embodiments, initiating the RA procedure comprises: initiating the RA procedure in a Special Cell (SpCell) and ignore the command after the end of the time window in the SpCell only.

In some embodiments, initiating the RA procedure comprises: initiating the RA procedure in a Special Cell (SpCell) and ignore the command after the end of the time window in a subset of serving cells in a cell group comprising the SpCell.

In some embodiments, the initiating the RA procedure comprises: initiating the RA procedure in a Special Cell (SpCell) and ignore the command after the end of the time window in all serving cells in a cell group comprising the SpCell.

In some embodiments, ignoring or performing the command after the end of the time window comprises: performing the command after the end of the time window in accordance with a determination that the contention resolution is unsuccessful or the RA procedure is unsuccessfully completed.

In some example embodiments, the method 700 further comprises: in accordance with a determination that a transmission on the downlink control channel is received, the transmission being addressed to a Cell Radio Network Temporary Identifier (C-RNTI) of the first apparatus and containing an uplink grant for a new transmission: determining that the contention resolution is successful or the RA procedure is successfully completed, stopping the time window, determining whether the uplink grant can accommodate all data to be transmitted by the first apparatus, in accordance with a determination that the uplink grant can accommodate all the data, transmitting the data to the second apparatus based on the uplink grant, and ignoring or performing the command after the end of the time window comprises performing the command after stopping the time window or after transmitting the data.

In some embodiments, ignoring or performing the command after the end of the time window comprises: ignoring the command after stopping the time window or after transmitting part of the data in accordance with a determination that the uplink grant cannot accommodate all the data.

In some embodiments, the time window is defined by at least one of the following: a contention resolution timer, a message B response window, or an RA response window.

In some embodiments, ignoring the command comprises monitoring the downlink control channel.

In some example embodiments, a first apparatus capable of performing any of the method 700 (for example, the first apparatus 110) may comprise means for performing the respective steps of the method 700. The means may be implemented in any suitable form. For example, the means may be implemented in a circuitry or software module.

In some example embodiments, the first apparatus comprises: means for receiving, from a second apparatus, a command indicating the first apparatus to skip monitoring a downlink control channel between the second apparatus and the first apparatus for a time period; means for initiating a random access (RA) procedure towards the second apparatus, the time period at least partially overlapping with a time window associated with the RA procedure, and an end of the time period being after an end of the time window; means for determining whether the RA procedure is successfully completed or contention resolution for the RA procedure is successful; and means for ignoring or performing the command after the end of the time window based on the determination.

In some example embodiments, the first apparatus further comprises: means for determining the end of the time window based on one of the following: the time window being stopped, or expiration of the time window.

In some embodiments, the means for ignoring or performing the command after the end of the time window comprises: means for ignoring the command after stopping the time window in accordance with a determination that the contention resolution is successful or the RA procedure is successfully completed.

In some example embodiments, the first apparatus further comprises: means for determining that the contention resolution is successful in accordance with a determination that a transmission on the downlink control channel is received within the time window, the transmission being addressed to a Cell Radio Network Temporary Identifier (C-RNTI) of the first apparatus.

In some embodiments, the transmission contains an uplink grant for a new transmission.

In some example embodiments, the first apparatus further comprises: means for stopping the time window in accordance with a determination that the transmission on the downlink control channel is received.

In some embodiments, the means for initiating the RA procedure comprises: means for initiating the RA procedure in a Special Cell (SpCell) and ignore the command after the end of the time window in the SpCell only.

In some embodiments, the means for initiating the RA procedure comprises: means for initiating the RA procedure in a Special Cell (SpCell) and ignore the command after the end of the time window in a subset of serving cells in a cell group comprising the SpCell.

In some embodiments, the means for initiating the RA procedure comprises: means for initiating the RA procedure in a Special Cell (SpCell) and ignore the command after the end of the time window in all serving cells in a cell group comprising the SpCell.

In some embodiments, the means for ignoring or performing the command after the end of the time window comprises: means for performing the command after the end of the time window in accordance with a determination that the contention resolution is unsuccessful or the RA procedure is unsuccessfully completed.

In some example embodiments, the first apparatus further comprises: means for performing the following: in accordance with a determination that a transmission on the downlink control channel is received, the transmission being addressed to a Cell Radio Network Temporary Identifier (C-RNTI) of the first apparatus and containing an uplink grant for a new transmission: determining that the contention resolution is successful or the RA procedure is successfully completed, stopping the time window, determining whether the uplink grant can accommodate all data to be transmitted by the first apparatus, in accordance with a determination that the uplink grant can accommodate all the data, transmitting the data to the second apparatus based on the uplink grant, and the means for ignoring or performing the command after the end of the time window comprises means for performing the command after stopping the time window or after transmitting the data.

In some embodiments, the means for ignoring or performing the command after the end of the time window comprises: means for ignoring the command after stopping the time window or after transmitting part of the data in accordance with a determination that the uplink grant cannot accommodate all the data.

In some embodiments, the time window is defined by at least one of the following: a contention resolution timer, a message B response window, or an RA response window.

In some embodiments, the means for ignoring the command comprises means for monitoring the downlink control channel.

Figure 8:
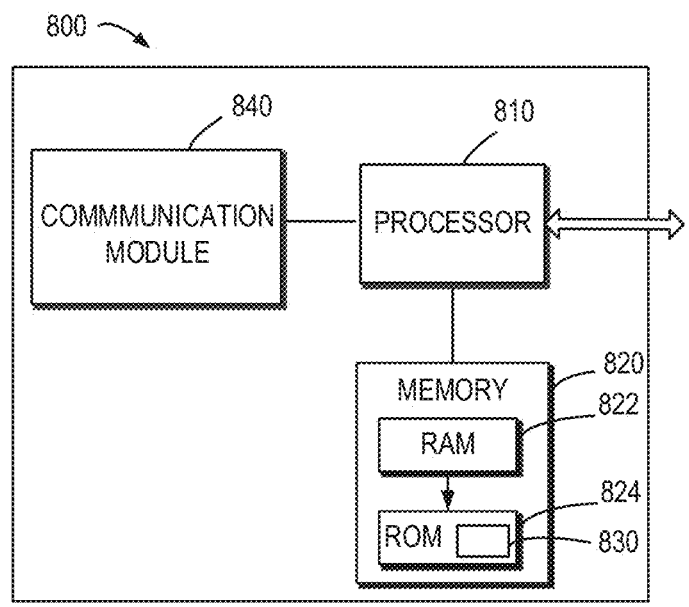
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example, the first apparatus 110 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 1 to 7. The embodiments of the present disclosure may also be implemented by hardware or by a combination of software and hardware.

Figure 9:
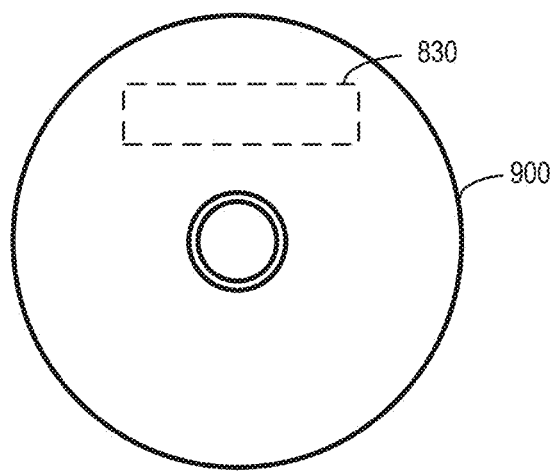
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 as described above with reference to FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:
   at least one processor; and
   at least one memory storing instructions that, when executed by the at least one processor, cause the apparatus at least to:
   receive, from a second apparatus, a command indicating the first apparatus to skip monitoring a downlink control channel between the second apparatus and the first apparatus for a time period;
   initiate a random access (RA) procedure towards the second apparatus, the time period at least partially overlapping with a time window associated with the RA procedure, and an end of the time period being after an end of the time window, wherein the time window is defined by a contention resolution timer;
   determine that contention resolution for the RA procedure is successful; and
   based on the determination, ignore the command after the end of the time window.

2. The first apparatus of claim 1, wherein the first apparatus is further caused to determine the end of the time window based on one of the following:
   the time window being stopped, or
   expiration of the time window.

3. The first apparatus of claim 1, wherein the first apparatus is further caused to:
   in accordance with a determination that a transmission on the downlink control channel is received within the time window, determine that the contention resolution is successful, the transmission being addressed to a Cell Radio Network Temporary Identifier (C-RNTI) of the first apparatus.

4. The first apparatus of claim 3, wherein the transmission contains an uplink grant for a new transmission.

5. The first apparatus of claim 3, wherein the first apparatus is further caused to:
   in accordance with a determination that the transmission on the downlink control channel is received, stop the time window.

6. The first apparatus of claim 1, wherein the first apparatus is caused to initiate the RA procedure in a Special Cell (SpCell) and ignore the command after the end of the time window in the SpCell only.

7. The first apparatus of claim 1, wherein the first apparatus is caused to initiate the RA procedure in a Special Cell (SpCell) and ignore the command after the end of the time window in a subset of serving cells in a cell group comprising the SpCell.

8. The first apparatus of claim 1, wherein the first apparatus is caused to initiate the RA procedure in a Special Cell (SpCell) and ignore the command after the end of the time window in all serving cells in a cell group comprising the SpCell.

9. The first apparatus of claim 1, wherein ignoring the command comprises monitoring the downlink control channel.

10. The first apparatus of claim 1, wherein the RA procedure is a 4-step RA procedure.

11. A method, comprising:
    receiving, at a first apparatus from a second apparatus, a command indicating the first apparatus to skip monitoring a downlink control channel between the second apparatus and the first apparatus for a time period;
    initiating a random access (RA) procedure towards the second apparatus, the time period at least partially overlapping with a time window associated with the RA procedure, and an end of the time period being after an end of the time window, wherein the time window is defined by a contention resolution timer;
    determining that contention resolution for the RA procedure is successful; and
    ignoring the command after the end of the time window based on the determining.

12. A non-transitory computer readable medium comprising a computer program for causing an apparatus to perform:
    receiving, at a first apparatus from a second apparatus, a command indicating the first apparatus to skip monitoring a downlink control channel between the second apparatus and the first apparatus for a time period;
    initiating a random access (RA) procedure towards the second apparatus, the time period at least partially overlapping with a time window associated with the RA procedure, and an end of the time period being after an end of the time window, wherein the time window is defined by a contention resolution timer;
    determining that contention resolution for the RA procedure is successful; and
    ignoring the command after the end of the time window based on the determining.

* * * * *